US008414390B1

(12) United States Patent
Paleja et al.

(10) Patent No.: US 8,414,390 B1
(45) Date of Patent: Apr. 9, 2013

(54) SYSTEMS AND METHODS FOR THE ELECTRONIC DISTRIBUTION OF GAMES

(75) Inventors: Ameesh Paleja, Lynnwood, WA (US); Isaac J. Shepard, Ladera Ranch, CA (US); Patrick G. McCuller, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 560 days.

(21) Appl. No.: 12/570,604

(22) Filed: Sep. 30, 2009

(51) Int. Cl.
- A63F 13/00 (2006.01)
- A63F 9/24 (2006.01)
- G06F 17/00 (2006.01)
- G06F 19/00 (2011.01)

(52) U.S. Cl. .................................. 463/29; 463/43
(58) Field of Classification Search .................... 463/29, 463/43
See application file for complete search history.

(56) References Cited

U.S. PATENT DOCUMENTS

| | | | | |
|---|---|---|---|---|
| 5,805,829 | A * | 9/1998 | Cohen et al. | 709/202 |
| 5,916,024 | A | 6/1999 | Von Kohorn | |
| 5,999,908 | A | 12/1999 | Abelow | |
| 6,024,643 | A | 2/2000 | Begis | |
| 6,073,214 | A * | 6/2000 | Fawcett | 711/133 |
| 6,883,168 | B1 * | 4/2005 | James et al. | 717/178 |
| 6,983,315 | B1 * | 1/2006 | Crutcher | 709/220 |
| 6,996,817 | B2 * | 2/2006 | Birum et al. | 717/170 |
| 7,243,226 | B2 * | 7/2007 | Newcombe et al. | |
| 7,565,425 | B2 | 7/2009 | Van Vleet et al. | |
| 7,621,813 | B2 | 11/2009 | Bortnik et al. | |
| 7,685,416 | B2 * | 3/2010 | Newcombe et al. | 713/155 |
| 7,867,094 | B1 | 1/2011 | Wisdom et al. | |
| 7,895,261 | B2 * | 2/2011 | Jones et al. | 709/203 |
| 2001/0044339 | A1 | 11/2001 | Cordero et al. | |
| 2002/0165026 | A1 * | 11/2002 | Perkins et al. | 463/42 |
| 2003/0172270 | A1 * | 9/2003 | Newcombe et al. | 713/168 |
| 2003/0220984 | A1 * | 11/2003 | Jones et al. | 709/219 |
| 2003/0221189 | A1 * | 11/2003 | Birum et al. | 717/170 |
| 2005/0204353 | A1 * | 9/2005 | Ji | 717/168 |
| 2006/0095475 | A1 | 5/2006 | Martinez et al. | |
| 2006/0179155 | A1 * | 8/2006 | Bunting et al. | 709/232 |
| 2007/0180509 | A1 * | 8/2007 | Swartz et al. | 726/9 |
| 2007/0289026 | A1 * | 12/2007 | Newcombe et al. | 726/29 |
| 2008/0220859 | A1 | 9/2008 | Haeuser et al. | |

(Continued)

OTHER PUBLICATIONS

Baty, Oliver, web page article "Protecting a download using a unique URL", downloaded from http://web.archive.org/web/20081017114632/http://www.ardamis.com/2008/06/11/protecting-a-download-using-a-unique-url/, with a archive.org verified date of Jun. 6, 2008.*

(Continued)

*Primary Examiner* — Peter DungBa Vo
*Assistant Examiner* — Nicholas Ditoro
(74) *Attorney, Agent, or Firm* — Knobbe, Martens, Olson & Bear LLP

(57) ABSTRACT

In certain embodiments, computer systems and methods are provided that allow a game distribution platform to distribute, update and/or control copies of games published across multiple game portals. In some embodiments, copies of the games are maintained in data storage on the game distribution platform and distributed to game portals and/or gaming devices. Additional content for purchase may also be stored on the data storage and available for purchase during a gaming session. Advantageously, in certain embodiments the game distribution platform enables game portals and/or gaming devices to receive the latest version of a game and/or a player's purchased content when a player selects to play the game.

18 Claims, 8 Drawing Sheets

U.S. PATENT DOCUMENTS

2008/0234038 A1    9/2008   Jiao et al.
2008/0313261 A1*  12/2008   Kouda ........................ 709/201
2009/0055270 A1*   2/2009   Magdon-Ismail et al. ...... 705/14

OTHER PUBLICATIONS

The computer game "Ur-Quan Master"s version 0.6.2, as evidenced by the game installer and the source code available at http://sourceforge.net/projects/sc2/files/UQM/0.6.2/, with a sourceforge.net verified date of Jan. 2007.*

Valve Corporation, Steamworks Brochure, downloaded from http://web.archive.org/web/20090612170314/http://www.stearngames.com/steamworks/SteamworksBrochure2009.pdf with an archive.org verified date of Jun. 12, 2009.

"Here is info about other flash-ad-network", dated Apr. 13, 2008, printed from http://blog.elite-games.net/blog4.php/2008/04/13/here-is-info-about-other-flash-ad-networ.

Steam News, Press release titled "Steam Cloud Rolling in This Week", dated Nov. 3, 2008, http://store.steampowered.com/news/1968/.

Mochi, Press release titled "Mochi Media Announces Launch of Mochi Coins, a New Premium Flash Game Platform", dated Jul. 21, 2009, downloaded from http://www.mochimedia.com/aboutus/release/20090721_Mochi_Media_Mochi_Coins.pdf.

GameJacket Terms of Service, GameJacket | Online Game Advertising, retrieved from http://web.archive.org/web/20080719115958/www.gamejacket.com/terms.asp, dated Jul. 19, 2008.

U.S. Appl. No. 12/570,531, filed Sep. 30, 2009, Shepard et al.
U.S. Appl. No. 12/570,569, filed Sep. 30, 2009, McCuller et al.

* cited by examiner

SYSTEMS AND METHODS FOR THE ELECTRONIC DISTRIBUTION OF GAMES

BACKGROUND

For the most part, computer games are distributed using physical media, such as compact discs (CDs) or digital versatile discs (DVDs). However, the growth in Internet use has made digital distribution of games more desirable. The lower costs of digital distribution over a computer network versus distribution using physical medium can only be expected to further drive the growth of the digital distribution channel. A growing number of games are now available through digital downloads, either as an alternative to physical medium or as the exclusive distribution channel for the game.

Currently, game portals on the Internet provide online distribution of games. These game portals store games and provide them to players accessing the game portals. Games can be downloaded to the player's gaming device, either as stand alone applications or to be played using an existing program, such as a web browser. The same game can be stored and provided by a number of game portals.

BRIEF DESCRIPTION OF THE DRAWINGS

Throughout the drawings, reference numbers may be re-used to indicate correspondence between referenced elements. The drawings are provided to illustrate embodiments of the inventions described herein and not to limit the scope thereof.

DETAILED DESCRIPTION OF SPECIFIC EMBODIMENTS

Existing electronic distribution systems of games typically provide a discrete electronic copy of the game. For instance, for online games several versions of the same game, including older, less up-to-date versions, can be published on-line at the same time on different game portals. As a result, players may not get a consistent gaming experience for the same game and game developers may have difficulty controlling the presentation, as well as access to their game.

In certain embodiments, computer systems and methods are provided that allow a game distribution platform to update and/or control copies of games published across multiple game portals. In some embodiments, copies of the games are maintained in central storage on the game distribution platform and distributed to game portals and/or gaming devices. Advantageously, in certain embodiments the game distribution platform enables game portals and/or gaming devices to receive the latest version of a game when a player selects to play the game.

Figure 1:
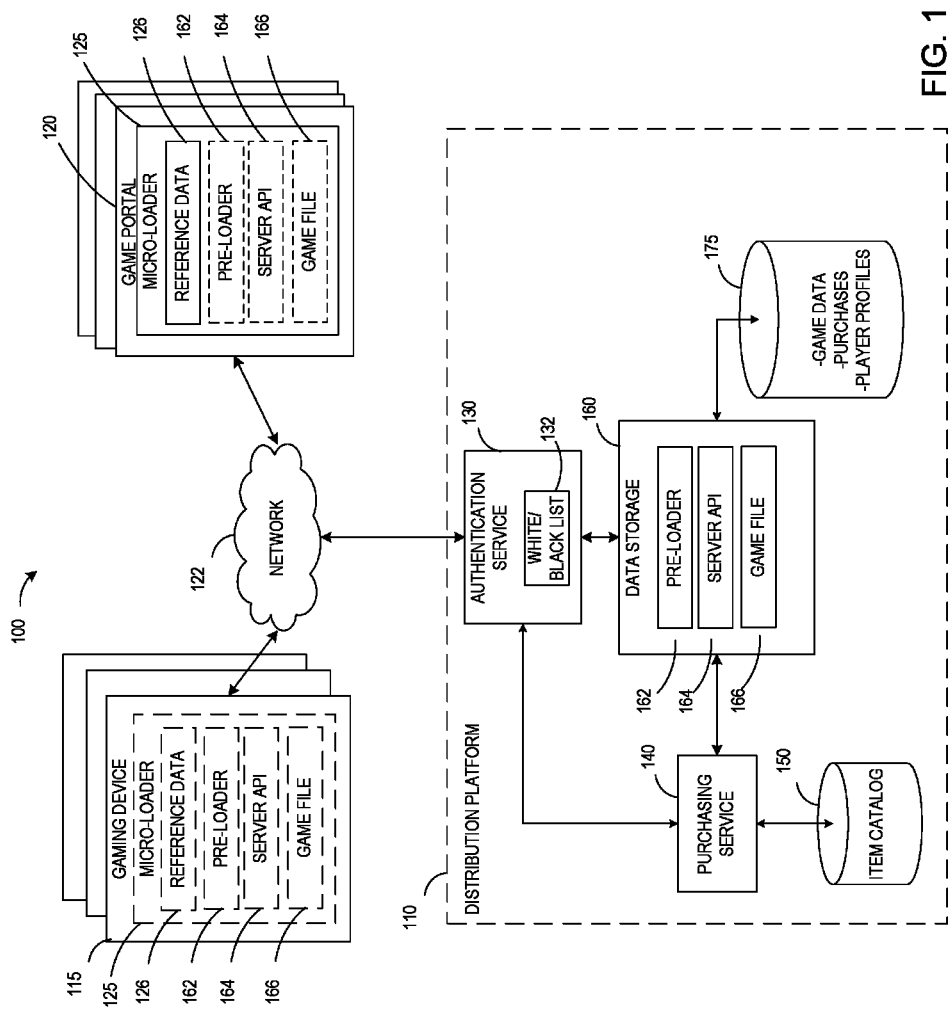
FIG. 1 illustrates an embodiment of a distribution system for computer games.

FIG. 1 illustrates one embodiment of a distribution platform 110, a network-accessible computer system operated by a platform provider. The distribution platform 110 makes games available to end users via at least one, and typically many, different game portals 120 connected through a computer network 122, such as the Internet. Each game portal is typically in the form of a web site hosted on a server system, and at least some of the game portals are typically operated or provided by different entities than others. Gaming devices 115, which are user computing devices such as a personal computer (PC), personal digital assistant (PDA), or other computing device, can connect to game portals and allow the end user or player to play games.

For purposes of illustration, a sample scenario will now be discussed in which the embodiment of FIG. 1 is used in operation. In this sample scenario, a developer submits a game to a distribution platform 110 for deployment of the game. The game comprises one or more computer data files defining the game. The distribution platform handles publishing the game to different game portals as well as implementing additional functionality accessible from the game through an application protocol interface (API).

The developer submits the game to the distribution platform 110 over a network through a game submission interface, such as a web page or application in communication with the platform provider's distribution platform. The developer submits one or more computer data files defining the game to the distribution platform. Additionally, the developer can submit optional content that is made available to the player for purchase, as a reward, and/or as part of a promotion.

Once the distribution platform 110 receives the game files, the distribution platform generates a micro-loader module 125 for the submitted game. The micro-loader is provided to game portals 120 and allows download of the game files for the game. The micro-loader module includes information relating to the game, such as a game identifier, game settings, and/or displayable text. In one embodiment, the micro-loader module is generated without including game files; instead the micro-loader includes references 126 to game files, a settings file, and/or a text file stored in the distribution platform.

The separation between the micro-loader 125 and the game files 166 in some embodiments advantageously allows the game files to be updated without changes to the gaming portals publishing the micro-loader. Additionally, the distribution platform 110 retains control over the game by controlling access to the game files without having to control distribution of the micro-loader. For example, once a micro-loader is distributed to a game portal, other game portals can copy the micro-loader with or without the developer's permission. However, because the micro-loader does not contain the actual game files, the micro-loader connects to the distribution platform to receive the game files. Authentication processes can then be implemented on the distribution platform to control access to the game files when micro-loaders request the game files.

Once the micro-loader 125 is distributed to gaming portals 120, players access the micro-loader and receive the game. For example, the micro-loader can be a Flash application provided on a web page of a game portal. The player loads the web page on his gaming device 115, which results in the micro-loader being downloaded to that computer. The micro-loader is then run on the gaming device, causing the micro-loader to request the game files from the distribution platform. In some embodiments, the micro-loader also requests additional micro-loader component files to extend the functionality of the micro-loader. In some embodiments, the requests to the distribution platform 110 comprise the game identifier, which the distribution platform uses to determine corresponding game files and/or components. The distribution platform then provides the corresponding files to the instance of the micro-loader operating on the gaming device 115. In one embodiment, the game files and/or micro-loader are small web format (SWF) files for ADOBE FLASH. The micro-loader can load game files and components transparently, with game files and components not needing to account for the operation of the micro-loader or the settings file. This allows the developer to develop a game in his customary manner without knowing about the particular implementation of the micro-loader.

Optionally, the player can be asked to log in to the distribution platform 110 or game portal 115 in order to enable additional features such as in-game purchases and/or saving of game information. With the player logged in, the distribution platform can access the player's account information. For example, during a gaming session, the player can be prompted to purchase items and/or additional levels for the game. If the player purchases the game, the player's profile is updated to reflect the purchase, and content files corresponding to the purchased content are sent to the micro-loader. The micro-loader then loads the additional content files, enabling the player to access the new content.

Additionally, the distribution platform can allow the player to save game data to the distribution platform. For example, the player's game progress can be saved in the distribution platform such that the game progress is available the next time the player accesses the game, even if the user access the game from a different game portal 120 on the next visit. High scores, achievements, friend lists, and optional or purchased content information can also be saved to the distribution platform.

While the scenario above involves games designed to run in a web browser, the disclosed system and distribution model can also be used with games that do not make use of a web browser. Accordingly, the distribution system 100 may be used in other environments, such as with game consoles, cellular phones, and/or the like. In addition, the distribution system may be used to distribute other types of content, such as applications, applets, software tools, music, movies, videos or the like. Further, it is understood that the actions described as being carried out by the micro-loader 125 may be carried out by one or more components of the micro-loader.

Returning to FIG. 1, the distribution system 100 comprises of a distribution platform 110, one or more gaming devices 115, and/or one or more game portals 120 connected through a network 122, such as the Internet, a local or wide area network (LAN or WAN), or the like.

The gaming device 115 comprises a computing device, such as a computer, a game console, a portable game player, a cell phone, PDA or any device for playing electronic games. The gaming device includes at least one processor and a memory. The gaming device 115 can comprise an output device, such as a display or monitor, and an input device, such as a keyboard, keypad, mouse, controller, and/or the like.

The game portal 120 can be an online service, web site, or the like. The game portal 120 publishes a micro-loader 125 associated with a particular game. The game portal 120 can publish multiple micro-loaders 125 to provide multiple games. The game portal 120 can be implemented with a server system that may include one or more physical servers and/or other computing machines (not shown).

The distribution platform 110 provided by the platform provider can further include an authentication service 130, a purchasing service 140 and item catalog 150, and/or data storage 160. The authentication service 130, purchasing service 140, and data storage 160 can be implemented with a computer system that may include one or more physical servers and/or other computing machines (not shown). In addition, the authentication service 130, purchasing service 140, and data storage 160 can be implemented as a network resource, such as a web service, web site, or the like. In one embodiment, the distribution platform 110 operates on a cloud computing system.

In one embodiment, a micro-loader 125 program is provided on the game portal 120. The micro-loader 125 can be a SWF or Adobe Flash file, a Unity 3D file, JavaScript file, a compiled program, and/or the like. In an embodiment, the micro-loader 125 initially contains only reference data 126 for the game. When the gaming device 115 connects to the game portal 120 and requests a game, the micro-loader 125 corresponding to the requested game is downloaded to the gaming device 115. In an embodiment, the gaming device 115 runs the micro-loader 125, causing it to download game files 166 and/or additional components 162, 164 from the distribution platform 110. The game files 166 can include data files defining the game, additional content for the game, save data, and/or other files related to the game. The component files extend the functionality of the micro-loader 125 and can include a pre-loader 162, a server API 164, a survey component for surveying players, an Entertainment Software Rating Board (ESRB) rating display, and/or the like.

In one embodiment, the pre-loader 162 provides a loading screen to inform the player of the download status while other files are being downloaded. The pre-loader screen may displays advertisements while the game is loading.

In one embodiment, the server API 164 provides an interface between the game and the distribution platform 110. The server API 164 can provide the game access to functions that can be performed by the distribution platform 110. For example, such functions can include logging in the player, buying an item, getting the game content associated with a purchased item, showing purchasable items, and/or getting or saving profile or account data.

As will be appreciated by those skilled in the art, the micro-loader 125 can be provided in various configurations. In one embodiment, the micro-loader 125 operates on the game portal and downloads game files to the game portal in response to a player request to start the game. The game portal then sends the game files to the gaming device 115. In some embodiments, the micro-loader 125 can be a stand-alone application or a component of a larger application, such as an applet on a web page. In one embodiment, the micro-loader 125 can be initially provided with a partial set of game files, such as the first two levels of a game, and can download other game files later on.

Providing game files and components dynamically advantageously allows the micro-loader 125 to provide the latest files to the player and gaming device 15. In addition, changes to the game and/or components can be propagated transparently to the player. For example, if the developer creates a new version of the game, the developer can submit the new version to the distribution platform 110 to replace the old version. Once the new version is submitted the distribution platform 110 can respond to request for game files with the new version of the game files, enabling micro-loaders 125 to automatically receive the new version of the game. The player does not need to search for the latest files or check whether the game or micro-loader 125 is up to date.

In addition, the micro-loader 125 is typically smaller than the full game. A typical micro-loader size would be around 10 KB to 15 KB, while games typically range from hundreds of kilobytes to hundreds of megabytes in size. The micro-loader can be smaller or larger than the typical size based on the features and functionality included in the micro-loader. By publishing micro-loaders 125 instead of full games, game portals can reduce the amount of space and bandwidth used. In one embodiment, after the micro-loader 125 is downloaded to a gaming device 115, the micro-loader 125 can download the game directly from the distribution platform 110 without the game portal 125 storing the game. Thus, the game portals can provide a greater number of games using the same space and bandwidth.

Further, the micro-loader 125 can download only the files needed, allowing bandwidth to be more efficiently used. For example, the micro-loader 125 can skip downloading optional or purchasable content. Further, by partially downloading the game files, additional security is provided from computer hackers or software pirates who may try to enable or unlock optional content. In one embodiment, a gaming device 115 using the micro-loader 125 does not have the files containing the optional content available on the gaming device 115, making it impossible to unlock or enable the optional content. In one embodiment, the micro-loader 125 downloads the additional content only after the distribution platform 110 verifies that the player has purchased the optional content.

The micro-loader 125 includes reference data 126, such as a game identifier, a settings file reference, and/or a text file reference. In an embodiment, the micro-loader 125 corresponds to a particular game and contains the game identifier which identifies that game to the distribution platform 110. The settings file reference and/or text file reference can be a uniform resource locator (URL), internet protocol (IP) address, or other address reference identifying the location of a file. The settings file provides further dynamic information to the micro-loader 125. The text file allows the micro-loader 125 to dynamically change the text displayed by the micro-loader 125. For example, a text file in the language of the source country of the gaming device 115 or game portal 125 can be provided. Typically, the settings file location and text file location point to an access point to the distribution platform 110. In one embodiment, the access point is a gateway or authentication server operating an authentication service 130.

The distribution platform 110 is made up of one or more computer servers or other computing devices providing multiple services. Servers can be connected to each other through a network. In one embodiment, the distribution platform includes an authentication service 130 operating on an authentication server or gateway server. The authentication service 130 authenticates incoming requests from micro-loaders 125 running on gaming devices 115. The authentication service 130 can use a blacklist and/or whitelist 132 for checking requests. The authentication service 130 can authenticate the micro-loader 125 based on game developer identity, game ID, game portal, account, profile, combinations of the same or the like. Developers and game portal operators can establish accounts with the distribution platform, such as by interacting with a web site associated with the distribution platform.

The authentication service 130 can also allow players to log in to a player profile or account. Logging in can enable additional features by allowing the distribution platform 110 to track players' actions and/or purchases. For example, game data or additional content can be associated with a player profile.

In one embodiment, the authentication service 130 can be located on the game portal 120. The player can log into an account on the game portal 120, which can then authenticate the player to the distribution platform 110.

In an embodiment, the distribution platform 110 further includes a purchasing service 140 for selling additional game content. The purchasing service 140 can include one or more data repositories, such as a catalog repository 150 containing a listing of purchasable game content. The purchasing service 140 can include a visual interface, such as web page or window, for providing the item listing to the player. The purchasing service 140 can process orders from players and record these purchases in a player profile and/or account.

In one embodiment, the distribution platform 110 includes data storage 160 for storing micro-loader components 162, 164 and/or game files 166. The data storage 160 stores game information, such as game identifiers, game files, micro-loader components, purchase information, high scores, saved games, achievements, and/or the like. In one embodiment, the data storage 160 associates the game information for a particular game with that game's game identifier. The data storage 160 can include one or more electronic data repositories 175 for storing information, and can be implemented using any type or types of storage devices (e.g., magnetic disk drives, solid state memory arrays, etc.).

The various components shown in FIG. 1 can be implemented using software modules executed by one or more general purpose computers (physical machines) or servers. The authentication service 130 and/or purchasing service 130 may be implemented as respective programs using service code that generates responses in real time in response to requests from other entities. The interfaces for the authentication service 130, purchasing service 140 and data storage 160 may be implemented in a combination of executable code and web page templates. The executable code of the foregoing components 130, 140, and/or 160 may be stored on any type or types of physical computer storage device or medium, such as hard drives, tape drives, CDs, DVDs, RAM, ROM, flash and/or the like.

The data repositories 150, 175 shown in FIG. 1 may be implemented using any type or types of physical computer storage, and may be implemented using databases, flat files, or any other type of computer storage architecture.

In some embodiments, the authentication or gateway server serves as the primary communication point to the distribution platform 110. The gateway server can handle download requests from micro-loaders 125, request files or information stored on the data storage 160, and/or transmit files and/or information to the micro-loaders 125.

Figure 2A:
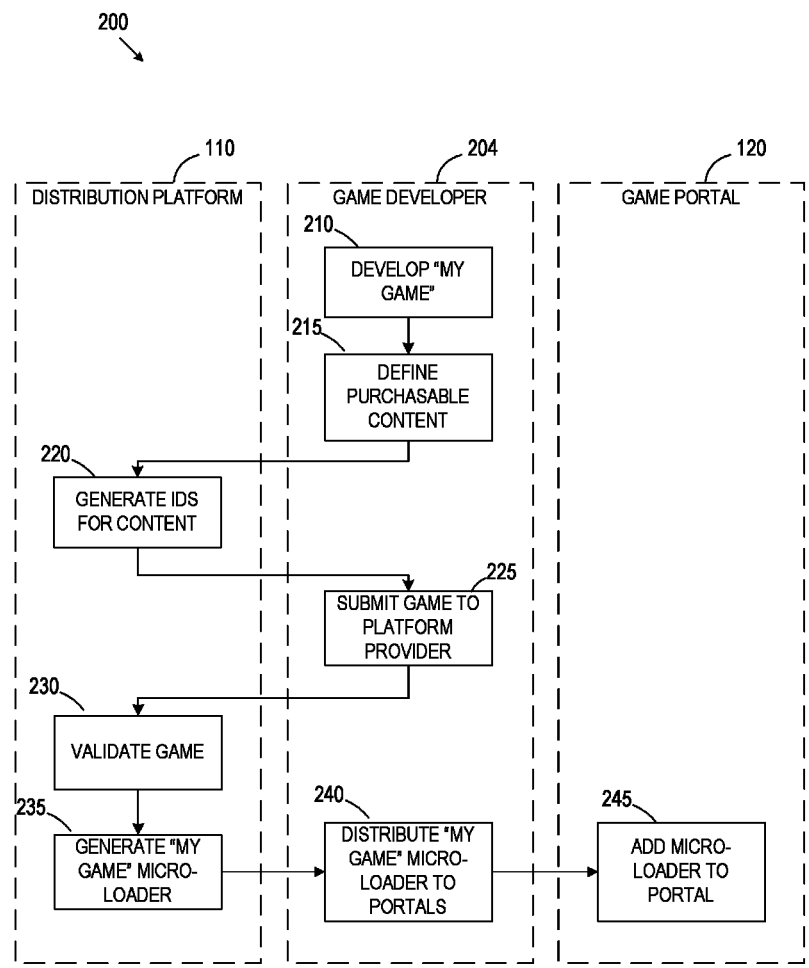
FIG. 2A illustrates an embodiment of a game publication process employed by the distribution system of FIG. 1.

FIG. 2A illustrates one embodiment of a game publication process. In the game publication process, the distribution platform 110 receives a game submission from a game developer 204 and, in response to the submission, generates a micro-loader 125 for distribution to game portals 120.

In block 210, the developer 204 creates a game called "My Game." In block 215, the developer decides what game content to make standard and what content is optional. A player initially has access to the standard content but can purchase or receive additional content. A developer can choose to not have any optional content and make all content standard or freely available. The developer submits the game to the distribution platform 110 with a designation of the content files. For example, level 1-5 of "My Game" can be standard, but additional levels are optional and need to be purchased in order to be played. In one embodiment, the developer 204 submits the game using an online service, web site, or the like.

In block 220, the developer 204 submits the purchasable content to the distribution platform 110. The distribution platform 110 creates purchase identifiers for the sellable content. The distribution platform 110 adds the purchasable content to its item catalog.

In block 225, the developer 204 submits "My Game" to the distribution platform 110. The distribution platform 110 generates and stores a game identifier for "My Game." The game identifier uniquely identifies the game and allows the distribution platform 110 to determine which content belongs to which game by assigning the game identifier to the content and/or purchase identifiers.

In block 230, the distribution platform 110 validates the game. In an embodiment, the distribution platform 110 checks for viruses, verifies ownership, and/or the like.

In block 235, the distribution platform 110 generates a micro-loader 125 corresponding to the game. The micro-loader 125 includes the game identifier associated with the game. In one embodiment, the micro-loader 125 does not contain any game files defining the game, but only reference data to those game files, such as a reference to a settings file listing the game files. The micro-loader 125 downloads the files from the distribution platform 110 when a player requests to play the game.

In block 240, the micro-loader 125 is distributed to one or more game portals 120. Distribution can be accomplished electronically through a network or by providing the micro-loader 125 on physical medium to the game portals 120.

In block 245, the game portals 120 publish the micro-loader 125, thereby providing access to the game from the game portals. Other portals can copy the micro-loader 125 from the publishing game portals without needing to contact the distribution platform 110. As the micro-loaders 125 themselves contact the distribution platform 110 to request game files, the distribution platform 110 does not need to track deployment of the micro-loaders 125 beforehand. Allowing micro-loaders 125 to be easily published encourages the game to become "viral" or widely published and available.

Figure 2B:
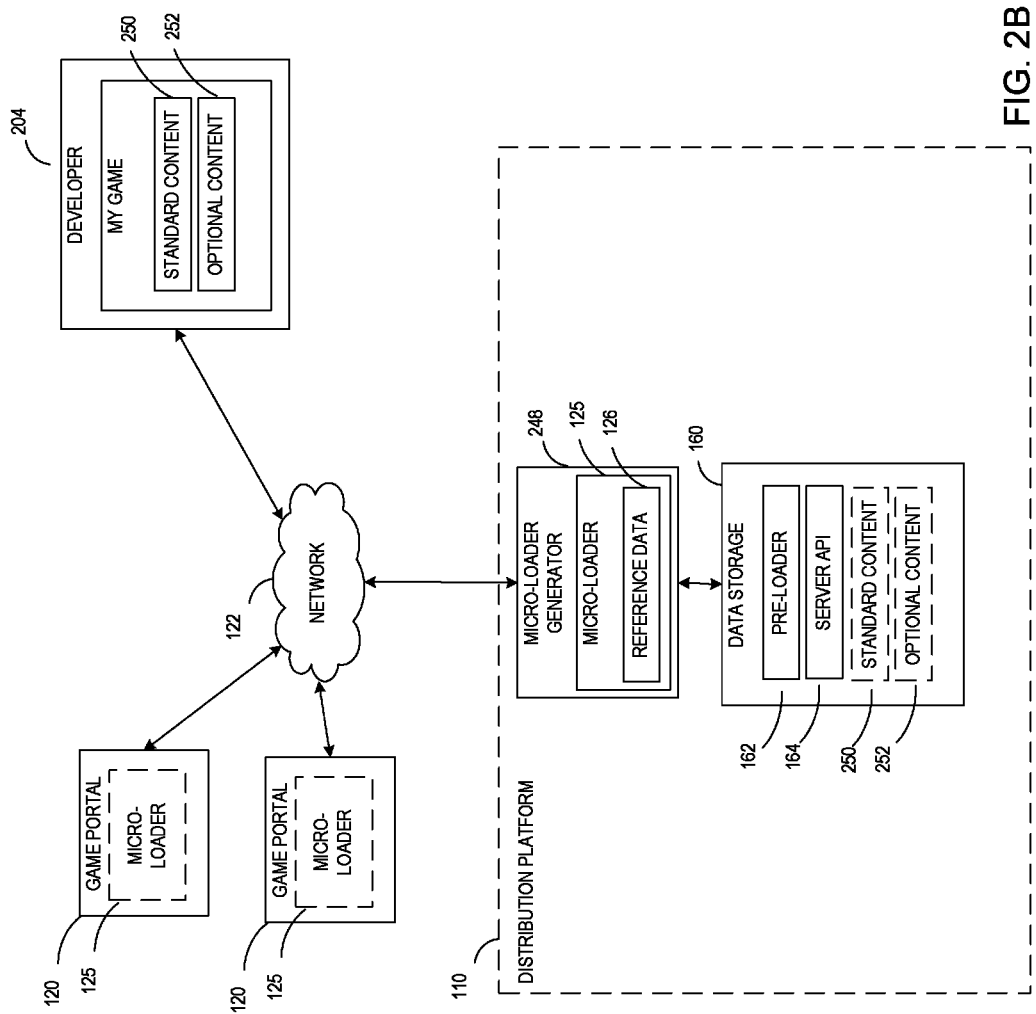
FIG. 2B illustrates an embodiment of the game distribution platform having a micro-loader generator.

FIG. 2B illustrates an embodiment of the game distribution platform 110 having a micro-loader generator 248. The developer 204 submits the game files for "My Game" comprising of standard 250 and optional content 252 to the distribution platform 110. The provider of the distribution platform may itself be a game developer, and may use the platform to distribute its own games. The game files can be submitted electronically through the network 122 or by physical storage medium. The game content 250, 252 can be stored on the data storage 160. The micro-loader generator 248 can generate a micro-loader for "My Game" having reference data 126 to at least a portion of the game content 250, 252. The distribution platform 110 can then transmit the micro-loader 125 to game portals 120 for publication of the micro-loader 125.

Figure 3:
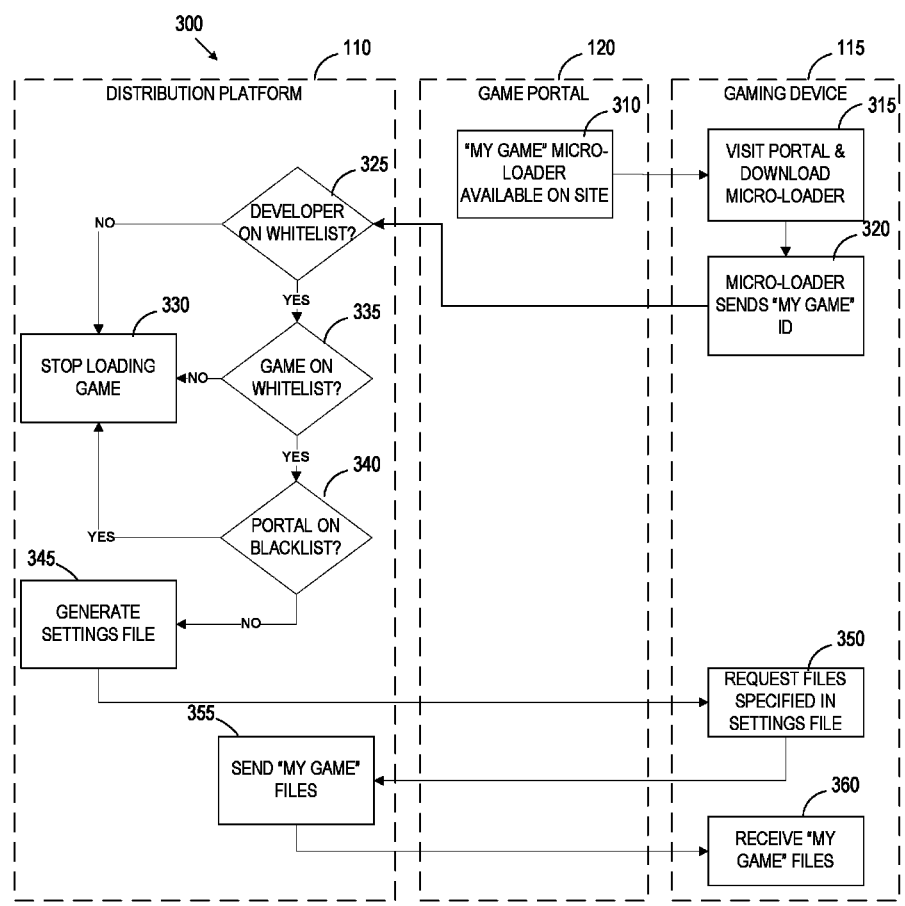
FIG. 3 illustrates an embodiment of a game loading process employed by the distribution system of FIG. 1.

FIG. 3 illustrates one embodiment of a game loading process 300 employed by the distribution system 100.

In block 310, the game portal 120 publishes the micro-loader 125 associated with "My Game." In one embodiment, the game files are not initially located on the game portal 120 but are stored on the distribution platform 110.

In block 315, a player visits the portal and downloads the micro-loader 125 onto his gaming device 115. In one embodiment, the micro-loader 125 initially does not include the game files for the game.

In block 320, the player runs the micro-loader 125 to load the game files for "My Game" onto his gaming device 115. The micro-loader 125 sends a download request, including its game identifier corresponding with "My Game," to the distribution platform 110.

In one embodiment, the micro-loader 125 includes a settings file reference, such as a URL or network address, for the location of a settings file and requests the settings file from the distribution platform 110. In one embodiment, the settings file location is a URL including the game identifier. The settings file may, for example, be an extensible markup language (XML) file. Other file formats, such as flat text files, S-expressions, JavaScript Object Notation (JSON), and/or text streams can also be used.

In some embodiments, the micro-loader 125 further includes a text file reference. The micro-loader 125 can request a text file using the text file reference in order to display dynamic messages, such as advertising, alerts, and/or the like. In one embodiment, the settings file includes the text file information and the micro-loader 125 does not separately download the text file. The text file can be a text stream, a flat text file, an XML file, or the like.

In some embodiments, the micro-loader 125 operating on the gaming device 115 can gather additional information from the gaming device 115 to provide to the distribution platform 110. For example, such information can include the country or language of the player, the type of the gaming device 115, and/or information about the current communication session between the gaming device 115 and distribution platform 110.

In decision blocks 325, 335 and 340, the distribution platform 110 authenticates the download request. After receiving the game identifier, the distribution platform 110 retrieves game information stored on the data storage 160 associated with the game identifier. In decision block 325, the distribution platform's authentication service 130 checks if the developer associated with the game is on a whitelist of approved developers. For example, if a developer decides to cease his relationship with the platform provider, the developer can be removed from the whitelist. If the developer is not on the whitelist, the micro-loader 125 request is rejected. If it is on the whitelist, the loading process continues.

In decision block 335, the game is compared against a whitelist for games. If the game is not on the whitelist, then the distribution platform 110 rejects the download request from the micro-loader 125. For example, the developer may have decided to stop supporting the game and thus the game is removed from the whitelist. If the game is on the whitelist, the loading process continues.

In decision block 340, the portal is checked against a blacklist of portals. If the portal is on the blacklist, the download request is rejected. For example, the blacklist can list portals that support pirated games, adult portals, portals owned by competitors, or the like. If the game is not on the blacklist, the loading process continues. In one embodiment, a whitelist listing authorized portals can be used. By using a blacklist and/or whitelist, the developer or platform provider can control which portals the game appears on and prevent it from appearing on undesirable portals.

In block 345, the distribution platform 110 generates a settings file for the game by retrieving stored game information on the data storage 160. The settings file can comprise an order of operation, a session ID, and/or a file list. For example, the order of operation can specify in what order the micro-loader 125 loads the files. The session ID can identify the communication session between the gaming device 115 and the distribution platform 110. The file list can identify game files and/or micro-loader components to send to the micro-loader 125. The distribution platform 110 sends the settings file to the micro-loader 125.

In some embodiments, the settings file is dynamically generated, allowing the distribution platform 110 to specify the game files and/or components to send to the micro-loader at the time the download request is received.

In an example scenario of one embodiment of the system, during a first download request from the micro-loader 125, version 1.0 of the game is available and the distribution platform 110 generates a settings file listing the game files in version 1.0. The micro-loader 125 then downloads the version 1.0 files listed in the settings file. After the first download request, version 2.0 of the game is uploaded to the distribution platform 110 by the developer. When the micro-loader 125 next sends a download request, the distribution platform 110 generates a new settings file listing the game files in version 2.0. The micro-loader 125 then downloads the version 2.0 files listed in the settings file. By dynamically choosing game files and/or components at the time of the request, updates to the files and/or components can be provided to the micro-loader 125 automatically. Likewise, the distribution platform 110 can dynamically provide additional and/or updated micro-loader components to the micro-loader 125, allowing the functionality of the micro-loader 125 to be extended without generating a new micro-loader module. For example, the functionality of the server commands in the server API 164 can be updated or extended without changing the micro-loader 125 by updating just the server API 164 file. New features and functionality can be added to the micro-loader 125 by loading additional components.

In some embodiments, the distribution platform 110 sends a text file or message to the micro-loader 125 for display. The text file can be dynamically generated or selected from pre-existing text messages. The text can be an advertisement, an alert, instructions, general text localizations and/or the like.

In an embodiment, the settings file advantageously allows the set of files downloaded by the micro-loader 125 to be custom-tailored based on the portal, player, geographic location, age and/or other criteria while using the same micro-loader 125. For example, a micro-loader from a first portal can be configured to offer more game content than the same micro-loader from another portal. Also, if the player has logged in, the micro-loader 125 can provide any additional content that player may have purchased. In other examples, a different language or general text localization for the game can be provided based on the geographic location of the player or game content can be disabled or substituted based on age to provide parental controls.

In block 350, the micro-loader 125 receives the settings file and requests the files specified in the file. The settings file can specify files names and/or locations. In one embodiment, the settings file uses time-expiring URLs to specify the location of the files to control download access. The files specified on the settings file can be provided on data repositories in the distribution platform 110, such as the data storage 160. The files can also be located or cached on storage separate from the distribution platform 110. For example, the files can be cached on a content delivery network (CDN), which is a system of computers containing copies of data, placed at various points in a network so as to maximize bandwidth for access to the data from clients throughout the network. Typically, a client accesses a copy of the data on the CDN near to the client, as opposed to all clients accessing the same central server, thereby causing a bottleneck near that server.

In one embodiment, the settings file specifies an order of operation. The use of the settings file with an order of operation advantageously allows the micro-loader 125 to download the files in the order they are used, allowing the micro-loader 125 to begin presenting the game to the player sooner. For example, the pre-loader component can be downloaded first or early on so that a status can be displayed or an advertisement played while other files are downloaded. In another example, a game with 10 levels could have level 1 downloaded first and available to play while the other levels are still being downloaded. In one embodiment, the settings file further specifies a download order in addition to the order of operation.

In block 355, the distribution platform 110 responds to the download request from the micro-loader 125 on the gaming device 115 by sending the files for the game, such as game files and/or micro-loader components. In one embodiment, the files are sent according to the order specified in the settings file or according to the request of the micro-loader 125. In some embodiments, the distribution platform 110 may store more than one version of the game files if the developer has made changes to the game. If more than one version of a game file is available, the distribution platform 110 can identify and send the newest game file to ensure that players are playing up-to-date versions of the game.

In other embodiments, the distribution platform 110 selects a set of files to send based on selection criteria, such as the source game portal 120, gaming device 115, and/or player profile. For example, if the developer wants to provide an older version of the game for free but requires the player to purchase the newer version, then the distribution platform 110 can check the player's profile to see if the game was purchased and then provide the appropriate set of game files.

In another example, the distribution platform 110 may store different sets of game files for different gaming device types. Version A of the game can run on XBOX 360 but not on a PLAYSTATION 3, while version B runs on PLAYSTATION 3 but not on XBOX 360. The distribution platform 110 can provide Version A or Version B depending on the type of the console. By maintaining different sets of game files and sending the appropriate version based on the gaming device type, the distribution platform 110 can provide transparent cross-platform functionality to the players. The system can store game files versions for game consoles, computers, cell phones, PDAs, and/or specific operating systems, such as WINDOWS, MAC OS X, ANDROID or the like.

In block 360, the micro-loader 125 receives the game files for the game. Advantageously, in one embodiment, the micro-loader 125 can load completed files while other files are still downloading in order to increase responsiveness.

In addition to the embodiments shown, different authentication steps can be used in the system. In some embodiments, no authentication or only one or two of the developer, game, and portal whitelists/blacklists may be used. Whitelists may be used instead of blacklists and vice versa. In some embodiments, other authentication steps can be used in lieu of or in addition to the above authentication steps.

Figure 4A:
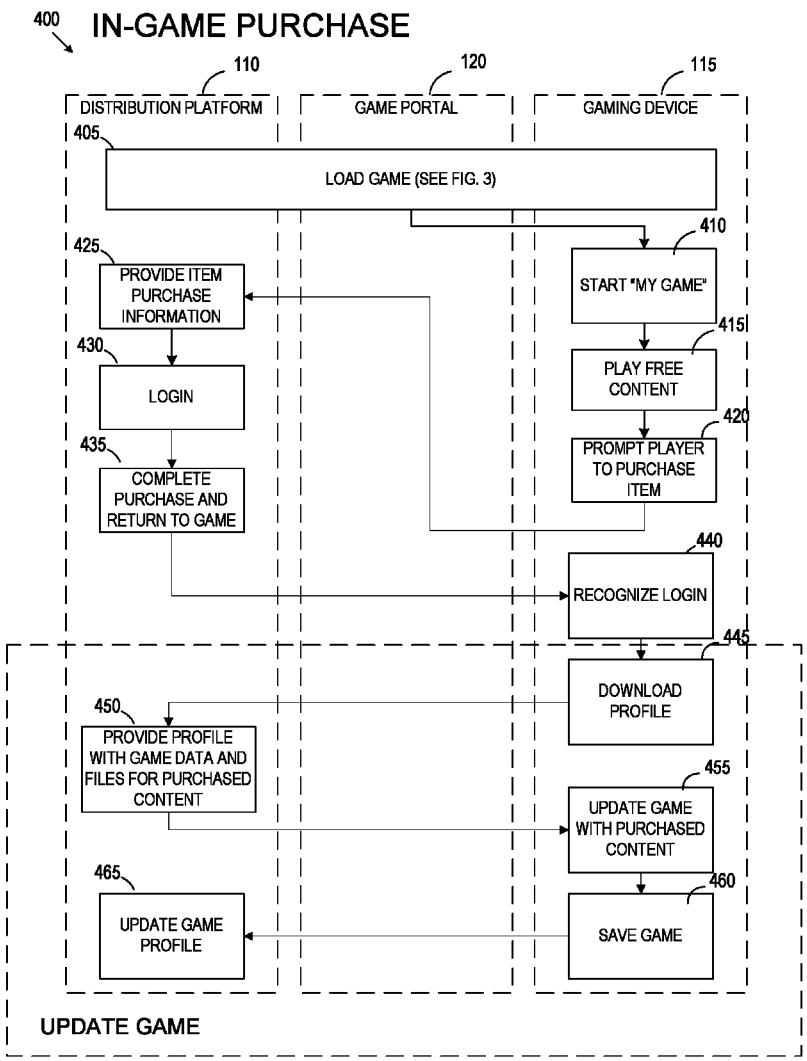
FIG. 4A illustrates an embodiment of an in-game purchase process employed by the distribution system of FIG. 1.

FIG. 4A illustrates an embodiment of an in-game purchase process 400. In block 405, the game is loaded onto the gaming device 115 as illustrated in FIG. 3. In block 410, the game is started.

In block 415, the player plays the free content provided by the developer. The micro-loader 125 loads the game files that the developer specified as free content. If the developer specified purchasable content, the game can prompt the player to purchase additional game content. For some games, there may not be purchasable content and revenues may be derived using an advertising model. The distribution platform 110 may control the collection of revenue from advertisers and/or users, and may cause this revenue to be divided between the platform provider, the developer of the particular game, and the portal operators.

In block 420, the player is prompted to purchase an item. In some embodiments, the item is purchasable directly from the game. The game can display an item list of purchasable content that can include a description, prices, purchase status, or the like. In some embodiments, the player may make the purchase via a corresponding item detail page of an electronic catalog hosted on a web site. If a player indicates that they wish to purchase an item, the micro-loader 125 sends a request to the distribution platform 110 to display a screen. The purchasable item can be permanent or consumable game content. Permanent content is available in the game permanently after purchase. Consumable content can be purchased in set amounts, with the amount available to the player decreasing as consumable content is used. In one embodiment, game files associated with the consumable content may be deleted once the amount available reaches zero. Permanent content can include game levels, game music, and/or game items, such as swords, armor, or the like. Consumable game content can include game items, such as arrows, potions, bombs, and/or the like.

In block 425, the distribution system 110 provides purchase information to the player. The purchase information can include a description, prices, purchase status, or the like. In one embodiment, a separate screen or "pop up" is shown on the player's gaming device 115 displaying the purchase information from the distribution system 110. The separate screen can be a web page of the purchasing service 140. In another embodiment, the gaming device 115 displays a purchase screen within the game. If the player chooses to proceed with the purchase, the player can be prompted for a login in order to identify a purchasing account.

In block 430, the player is prompted by the distribution system 110 to log into the player's account. The player may be asked a password and an account name. Accounts can have one or more profiles. These profiles provide "sub-accounts" for tracking information with greater granularity. For example, a family could have a single account but multiple profiles, one for each family member. Further, a single person could have multiple profiles. Each profile can maintain separate game information, such as game progress, achievements, high scores and/or the like. In some embodiments, the account and/or profile name is used as a player identifier to track actions of the user. For example, after signing in, future purchases or updates to game information can be recorded in the player's account and/or profile, though typically purchase information is stored in the account and shared across profiles.

In block 435, the player completes the purchase. The distribution platform 110 may receive a purchase order for game content from the player. The distribution platform 110 can record the purchase in the account and/or profile of the player. The player can resume playing the game after completing the purchase.

In block 440, the micro-loader 125 recognizes that the player is logged in. When the player is logged in, the micro-loader 125 can access account information, such as available profiles. In one embodiment, session information is stored on the distribution platform 110 while a key or session ID is stored on the gaming device 115, such as on a cookie or a file. The stored session information can include an indicator that the player previously logged in. By accessing the session information using the key, the micro-loader 125 can determine if the player is logged in.

In block 445, the micro-loader 125 downloads the player profile from the distribution platform 110. The micro-loader 125 can request the player to select from multiple profiles or can automatically select a profile, such as when a default profile is provided or where only a single profile exists.

In block 450, the distribution platform 110 responds to the profile request by providing the profile data, which could include game data, game saves, purchased content, or the like. The distribution platform 110 transmits the profile data to the gaming device 115. If the player has purchased additional content, the distribution platform 110 can transmit the purchased game files. In one embodiment, the distribution platform 110 generates an updated settings file listing the standard content and the purchased content and transmits the file to the micro-loader, causing the micro-loader to download the purchased content.

In block 455, the micro-loader 125 receives the profile data, along with any files for the purchased content. The micro-loader 125 updates the game by loading any additional content files. Once loaded, the content files enable the new content in the game.

In one embodiment, the content files define the game content and are not on the gaming device 115 before purchase, preventing the game content from being unlocked or enabled unless the game content is purchased. In another embodiment, the content files can be unlock codes or serial keys for enabling game content already on the gaming device 115, but disabled before the purchase.

In block 460, the player can save the game once the current gaming session is completed. In some embodiments, the game is saved in the distribution platform 110 in order to allow cross-platform game play.

In block 465, the distribution platform 110 responds to the save request by updating the player profile with any new save information. When the player accesses his account, the player can continue the game in the same stage or state by loading the save data. The saved stage or state can be a location in the game, a current state of the game, such as a current score or status, and/or a progress made by the player in the game.

In one embodiment, if the player has purchased consumable content, the distribution platform 110 updates the number of the consumable content recorded in the player profile after each use of the consumable content. The associated game files may be deleted from the gaming device 115 once the consumable content amount reaches zero. In some embodiments, game files may be deleted after the expiration of some amount of time, such as after the ending of a trial period.

In some embodiments, the player can purchase game content while not in a gaming session. Instead, the player can purchase content by logging into his account in the distribution system 110 before playing the game. For example, the player can purchase game content listed by the purchasing service 140 and have that purchase recorded into his account. When the player next plays the game for which he purchased additional content, the purchased content can be provided to the player automatically after he logs in to his account, causing the game to load the purchased content.

The profiles and accounts can have similar functions and a profile may be used in place of an account and vice versa. In some embodiments, there are no separate profiles, and information is stored in accounts. Information can be maintained per account or per profile.

After the game or game content is purchased, the revenue can be divided between the platform provider, the game portal provider, and/or the developer. In one embodiment, the distribution platform 110 tracks game and content sales to provide reports to purchasers and selling parties. For example, the distribution platform 110 can provide a report of the purchase history of the player. In another example, the distribution platform 110 can also provide reports aggregating the sales of the game content to provide a sales total for a particular game or game content. In one embodiment, the distribution platform 110 analyzes the purchase information and provides recommendations to the players of items to purchase based on the purchase histories of other similar players.

Figure 4B:
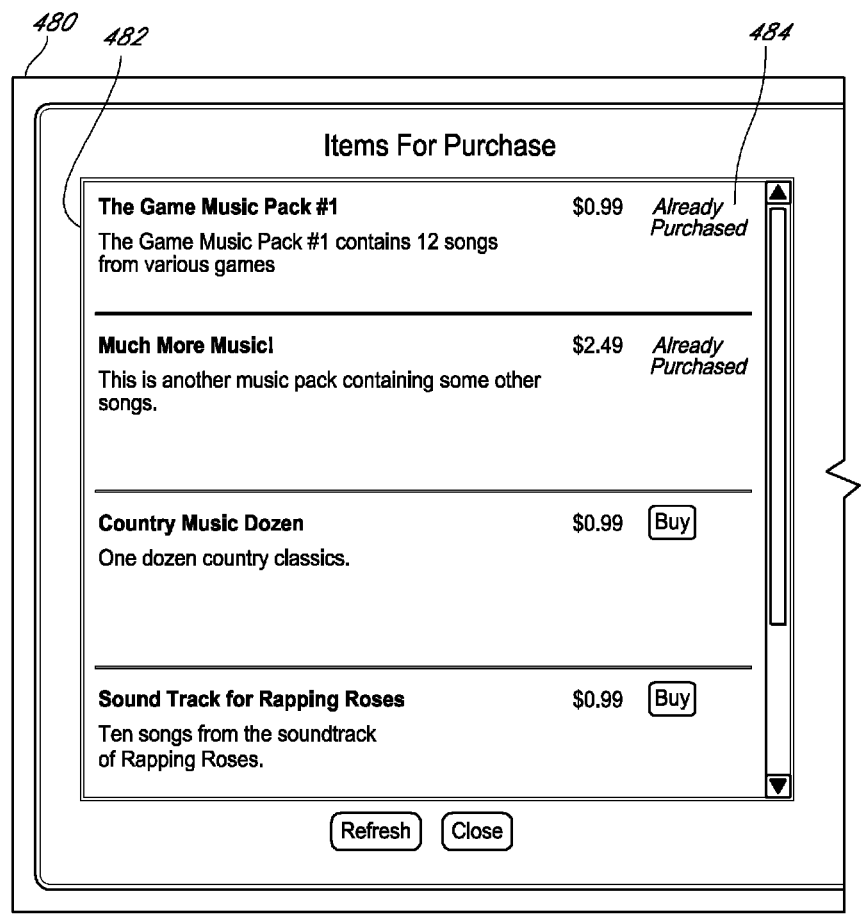
FIG. 4B illustrates an embodiment of an in-game purchase screen of a game.

FIG. 4B illustrates an embodiment of an in-game purchase screen of a game. The screen lists available game content 482 for a particular game. Purchase information 484, such as which items were previously purchased, item descriptions, price and/or the like can be provided to the player. The purchase information can reflect purchases made for an account from multiple gaming devices 115. In one embodiment, the game queries the distribution platform 110 for purchase information and/or available content 482 and uses that information to populate the game screen. In one embodiment, the game uses the server API 162 to query the distribution platform 110.

Figure 5:
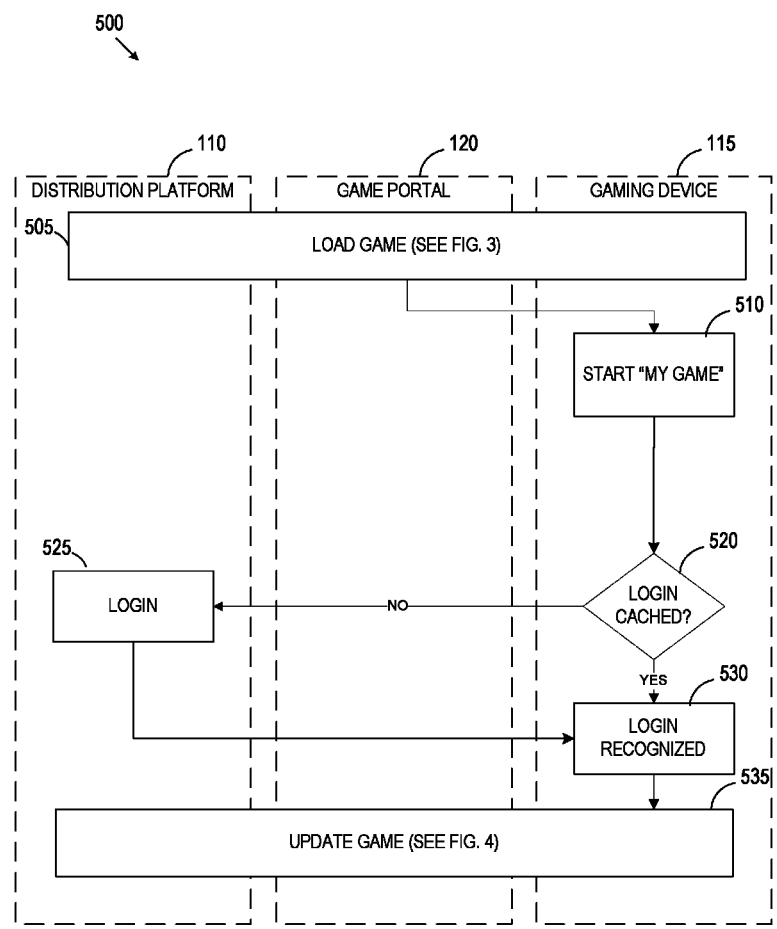
FIG. 5 illustrates an embodiment of a login process employed by the distribution system of FIG. 1.

FIG. 5 illustrates one embodiment of the login process. At block 505 the game is loaded. At block 510 the game is started.

At decision block 520, the micro-loader 125 operating on the gaming device 115 determines if login information is available. In some embodiments, login information can be kept in a cookie or other storage format on the gaming device 115. The login information can be the account name and/or password or an indication that the player is logged in, such as a session ID or key. If the player has previously logged into his account, the login information can be saved or cached on the gaming device 115. If the login information is unavailable, the micro-loader 125 operating on the gaming device 115 can prompt the player to login and the process proceeds to block 525. If the login information is available, then the login process proceeds to block 530.

At block 525, the login request is received by the distribution platform's authentication service 130. The authentication service 130 requests the player to login and verifies the information submitted by the player. The player may be prompted to enter an account name and password. After the login is completed, the micro-loader 125 is notified of the successful login. If the login fails, the player may be prompted to re-enter his login information. If the login process repeatedly fails, the account may be disabled.

At block 530, login information is available at the gaming device 115. With the available login information, the micro-loader 125 can access the player's account and/or profile information from the distribution platform 110. The micro-loader 125 can request the player's profile information, such as stored game data and/or purchased content.

At block 535, the game is updated with the game data and/or content associated with the player's profile or account as illustrated in FIG. 4.

Figure 6:
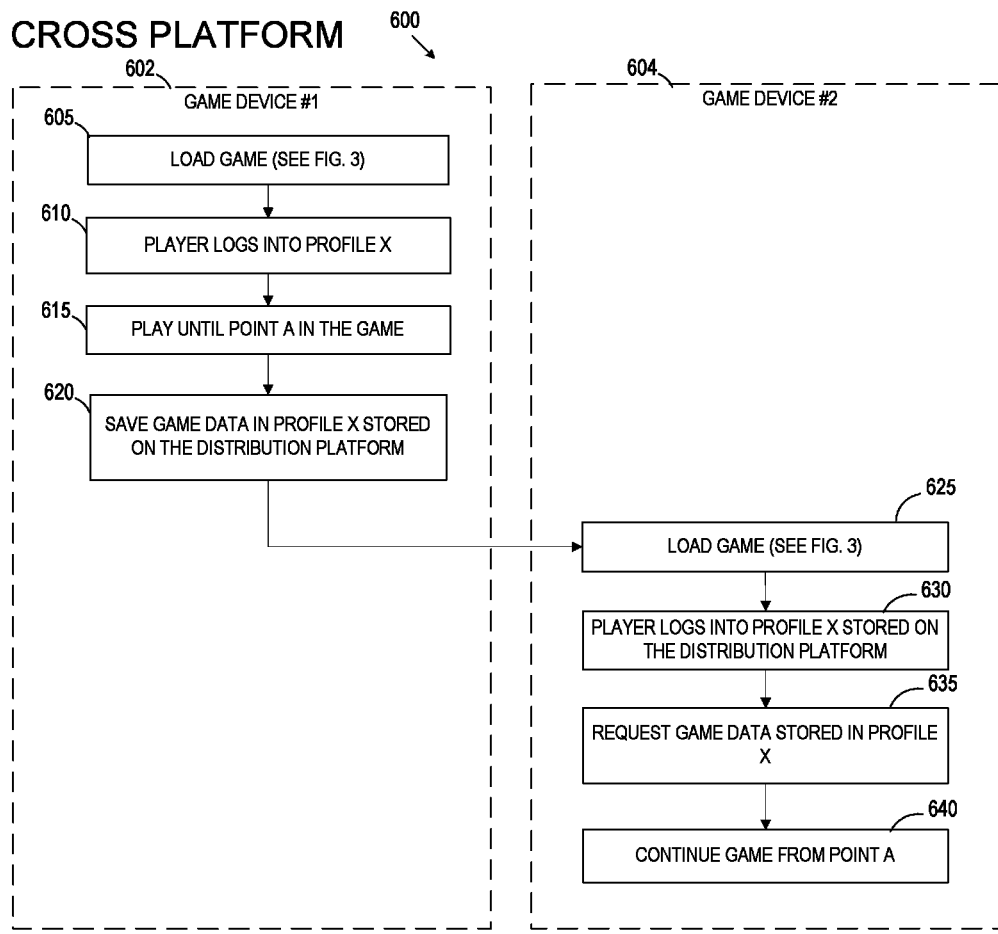
FIG. 6 illustrates an embodiment of a game loading process across multiple gaming devices.

FIG. 6 illustrates one embodiment of the game loading process 600 across multiple gaming devices 115. In some embodiments, game data, such as game progress, is saved by the distribution platform 110 in the player's profile and/or account. The player can access the game data across gaming devices 602, 604 by requesting the data from the distribution platform 110 (not shown).

In block 605, the player begins a first gaming session on the first gaming device 602. The first gaming device 602 loads the game by accessing the game on a first game portal.

In block 610, the player logs into his account and/or profile. In one embodiment, the player logs into the account by providing an account and/or profile name and password. The login information can be used as an identifier to track the actions of the player. When the player decides to end the gaming session, the player can choose to save the progress he's made in the game. In block 615, the player ends the session at point A in the game.

In block 620, the player's profile and/or account stored in the distribution system is updated with the game progress made during the gaming session. The player ends the first gaming session and stops the game.

In block 625, the player begins a new session using a second gaming device 604. For example, the player may have been playing a game on his laptop and then decides to play the same game on his desktop at home. The player connects his second gaming device 604 to a game portal having the same game. The game portal can be the same first game portal or could be a different game portal as long as both game portals publish the same game and micro-loader 125.

In block 630, the player logs into the distribution platform 110 in order to access the profile and/or account where he previously saved his game data. In block 635, the second gaming device 604 loads the game data, such as the game progress data, stored in the player's profile and/or account.

In block 640, the player continues the game from the previously saved point in the game. In some embodiments, other game data such as achievements, game scores and/or purchased content are also loaded from the player profile. In some embodiments, game data from other games may be used to determine gaming options in the current game. For example, an accomplishment in a first game may unlock additional content, such as new game levels or bonus items, in a second game. Such a feature can be used to encourage players of one game to play the other game.

In some embodiments, the first gaming device 602 can be the same or a different type than the second gaming device 604. For example, the first gaming device can be a console, such as XBOX 360 or PLAYSTATION 3, while the second gaming device can be a desktop computer. In some embodiments, the distribution platform 110 saves the game data in a common data format, such as XML, which can be read by different platforms.

In some embodiments, the distribution platform 110 tracks a gaming session of a player even when the player is not logged into their account. Instead, an "anonymous" account or profile is created on the distribution platform 110 and used to track the player's actions. In some embodiments, the anonymous profile is not associated with a particular player but is associated with a particular gaming device. The anonymous profile can track the gaming device using a gaming device identifier, such as a hardware ID, network address, Media Access Control address, and/or the like. The anonymous profile allows game state information to be saved to the distribution platform 110, enabling a player to continue a game session. For example, when the player begins playing the game, the distribution platform 110 can recognize the gaming device and allow a previous gaming session to continue. The anonymous profile can be retained for some time, such as several days, depending on the load and/or storage availability on the distribution platform 110. In some embodiments, the information stored on an anonymous profile is saved to a regular player account and/or profile when the player logs in to his regular account. In one embodiment, players are provided a choice of their existing profiles in which to store the information in the anonymous profile.

Each of the processes and algorithms described in the preceding sections may be embodied in, and fully automated by, code modules executed by one or more computers or computer processors. The code modules may be stored on any type of computer-readable medium or computer storage device, such as hard drives, solid state memory, optical disc, and/or the like. The processes and algorithms may also be implemented partially or wholly in application-specific circuitry. The results of the disclosed processes and process steps may be stored, persistently or otherwise, in any type of computer storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment.

While certain embodiments of the inventions disclosed herein have been described, these embodiments have been presented by way of example only, and are not intended to limit the scope of the inventions disclosed herein. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer-implemented method for enabling one or more gaming devices to obtain remotely stored games for presentation to users, the method comprising:
generating a micro-loader module comprising a game identifier, the game identifier corresponding to a game, wherein the micro-loader module is configured to, in response to a request to start a gaming session for the game, 1) request game files associated with the game and 2) dynamically load the game files;
providing the micro-loader module having the game identifier for publication on a plurality of game portals, the game portals accessible to gaming devices;
receiving a download request having the game identifier from a gaming device that downloaded a first instance of the micro-loader module from a game portal, the download request transmitted over a computer network by the first instance of the micro-loader module, wherein game files defining the game are not located on the game portal or the gaming device at the time the request to start the particular game is received;
identifying one or more game files associated with the game corresponding to the game identifier and one or more micro-loader components for extending the functionality of the micro-loader module; and
transmitting the one or more game files and the one or more micro-loader components to the first instance of the micro-loader module.

2. The method of claim 1, wherein the micro-loader components comprise at least one of:
a pre-loader module for displaying a screen indicative of a download status; and
an application program interface for interpreting commands from the game to the first instance of the micro-loader module.

3. The method of claim 1, further comprising generating a settings file comprising an order of operation for the micro-loader components, wherein the order of operation specifies the order in which the first instance of the micro-loader downloads the components.

4. The method of claim 3, the settings file further comprising an order of operation for the game files.

5. A computer-implemented method for enabling one or more game portals to obtain remotely stored games for presentation to users, the method comprising:
providing a micro-loader module having a game identifier for publication on a game portal, the game identifier corresponding to a particular game, the game portal accessible by a gaming device;
receiving a request having the game identifier from a gaming device, the request transmitted over a computer network by the micro-loader module downloaded to the gaming device, wherein game files defining the game are not located on the game portal or the gaming device at the time the request is received;
identifying one or more game files associated with the game corresponding to the game identifier and one or more micro-loader components for extending the functionality of the micro-loader module;
transmitting the one or more game files and the one or more micro-loader components to the micro-loader module; and
generating a settings file comprising an order of operation for the micro-loader components, wherein the order of operation specifies the order in which the micro-loader module downloads the components, wherein the game files or the micro-loader components are transmitted in the order specified by the order of operation.

6. The method of claim 1, further comprising generating, in response to the download request, a settings file comprising a list of the game files and the micro-loader components for transmission to the micro-loader module.

7. The method of claim 1, wherein identifying the one or more game files comprises identifying one or more game files corresponding to a newest version of the game.

8. The method of claim 1, wherein the one or more game files or the micro-loader components are small web format files.

9. The method of claim 1, further comprising authenticating the download request using at least one whitelist or blacklist.

10. The method of claim 9, wherein the at least one whitelist or blacklist comprises at least one of a developer list, a game list, and a portal list.

11. The method of claim 1, further comprising transmitting a text message to the first instance of the micro-loader.

12. The method of claim 11, wherein the text message to the first instance of the micro-loader comprises one or more of advertising, instructions, and general text localizations.

13. A micro-loader generation system for generating a micro-loader module for a game, the system comprising:

a computing system operative to receive a game from a developer, the game comprising a first selection of standard game data files to be provided to a player and a second selection of optional game data files available to the player, the game received over a computer network;

a game data repository operative to store the first selection and the second selection of game data files from the developer, the game data repository comprising physical computer storage; and a micro-loader generation system operative to:
    assign a game identifier to the first selection and the second selection of game data files;
    store the game identifier in the game data repository; and
    generate a micro-loader module comprising the game identifier, the micro-loader module operative to, in response to a request to start a gaming session for the game from a gaming device:
        request the first selection of data files from the game data repository using the game identifier; and
        dynamically load the first selection of data files on the gaming device for the gaming session.

14. The micro-loader generation system of claim 13, wherein the micro-loader module further comprises a reference to a settings file, the settings file comprising an order of operation for loading data files.

15. Non-transitory computer storage having stored thereon instructions that, when executed, direct a computing system to perform operations comprising:
    receiving, on the computing system, a game from a developer, the game comprising a first selection of standard game data files to be provided to a player and a second selection of optional game data files available to the player, the game received over a computer network;
    storing, on a game data repository, the first selection and the second selection of game data files from the developer, the game data repository comprising physical computer storage;
    assigning a game identifier to the first selection and the second selection of game data files;
    storing the game identifier in the game data repository; and
    generating a micro-loader module comprising the game identifier via a micro-loader generation system, the micro-loader module operative to, in response to a request to start a gaming session for the game from a gaming device:
        request the first selection of data files from the game data repository using the game identifier; and
        dynamically load the first selection of data files on the gaming device for the gaming session.

16. The non-transitory computer storage of claim 15, wherein the instructions further direct the computing system to:
    provide a network address location of a text message to the micro-loader module;
    wherein the micro-loader module is configured to download and display the text message.

17. The non-transitory computer storage of claim 16, wherein the network address location comprises an expiring uniform resource locator.

18. The non-transitory computer storage of claim 17, wherein the text message comprises one or more of advertising, instructions, and general text localizations.

* * * * *

UNITED STATES PATENT AND TRADEMARK OFFICE
CERTIFICATE OF CORRECTION

| | |
|---|---|
| PATENT NO. | : 8,414,390 B1 |
| APPLICATION NO. | : 12/570604 |
| DATED | : April 9, 2013 |
| INVENTOR(S) | : Ameesh Paleja et al. |

It is certified that error appears in the above-identified patent and that said Letters Patent is hereby corrected as shown below:

In the Claims

At column 18, line 29, in Claim 18, please change "claim 17" to --claim 16,--.

Signed and Sealed this
Twenty-second Day of October, 2013

Teresa Stanek Rea
*Deputy Director of the United States Patent and Trademark Office*